(12) United States Patent
Lin

(10) Patent No.: US 10,908,893 B2
(45) Date of Patent: Feb. 2, 2021

(54) PAGE UPDATE METHOD AND APPARATUS

(71) Applicant: Advanced New Technologies Co., Ltd., Grand Cayman (KY)

(72) Inventor: Chuanjie Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/685,210

(22) Filed: Nov. 15, 2019

(65) Prior Publication Data

US 2020/0081703 A1  Mar. 12, 2020

Related U.S. Application Data

(63) Continuation of application No. PCT/CN2018/099872, filed on Aug. 10, 2018.

(30) Foreign Application Priority Data

Aug. 16, 2017  (CN) .......................... 2017 1 0703234

(51) Int. Cl.
  *G06F 8/65* (2018.01)
  *G06F 16/957* (2019.01)
  *G06F 8/71* (2018.01)

(52) U.S. Cl.
  CPC ............... *G06F 8/65* (2013.01); *G06F 8/71* (2013.01); *G06F 16/9574* (2019.01)

(58) Field of Classification Search
  CPC .......... G06F 8/60; G06F 8/65; G06F 16/9574; G06F 8/71
  See application file for complete search history.

(56) References Cited

U.S. PATENT DOCUMENTS

| | | | |
|---|---|---|---|
| 8,875,057 | B2 | 10/2014 | Robertson-Hodder |
| 9,003,423 | B1 | 4/2015 | Rodriguez Valadez et al. |
| 9,495,338 | B1 | 11/2016 | Hollis et al. |
| 2004/0267712 | A1* | 12/2004 | Papanyan ........... G06F 16/9574 |
| 2007/0033155 | A1* | 2/2007 | Landsman ............ G06F 16/957 |
| 2011/0066676 | A1* | 3/2011 | Kleyzit .................. H04L 67/02 |
| | | | 709/203 |

(Continued)

FOREIGN PATENT DOCUMENTS

| | | |
|---|---|---|
| CN | 102521295 | 6/2012 |
| CN | 102904947 | 1/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Tuan C Dao
(74) *Attorney, Agent, or Firm* — Fish & Richardson P.C.

(57) ABSTRACT

A new page file of a progressive web application (PWA) page is obtained. A current page file of the PWA page is compared with the new page file. It is determined if there is a difference between the current page file and the new page file. In response to determining that there is a difference between the current page file and the new page file, a file version in the new page file is updated, and the new page file is used as the current page file.

24 Claims, 4 Drawing Sheets

(56) References Cited

U.S. PATENT DOCUMENTS

| | | | | |
|---|---|---|---|---|
| 2013/0002647 | A1* | 1/2013 | Bacus | G06T 15/00 |
| | | | | 345/419 |
| 2013/0159892 | A1 | 6/2013 | Suraj et al. | |
| 2014/0033019 | A1* | 1/2014 | Zhang | G06F 40/14 |
| | | | | 715/234 |
| 2014/0373001 | A1 | 12/2014 | Wang et al. | |
| 2015/0089348 | A1* | 3/2015 | Jose | G06F 16/9577 |
| | | | | 715/234 |
| 2016/0205166 | A1* | 7/2016 | Kolam | H04L 67/2847 |
| | | | | 709/213 |
| 2017/0228815 | A1* | 8/2017 | Plaehn | G06Q 10/087 |
| 2017/0315700 | A1* | 11/2017 | Rolih | G06F 3/04817 |

FOREIGN PATENT DOCUMENTS

| | | |
|---|---|---|
| CN | 103873502 | 6/2014 |
| CN | 104182241 | 12/2014 |
| CN | 105607927 | 5/2016 |
| CN | 105912324 | 8/2016 |
| CN | 106020798 | 10/2016 |
| CN | 106990975 | 7/2017 |
| CN | 107609042 | 1/2018 |
| TW | 200513891 | 4/2005 |
| TW | 201421263 | 6/2014 |

OTHER PUBLICATIONS

International Search Report and Written Opinion in International Application No. PCT/CN2018/099872, dated Nov. 15, 2018, 9 pages (with Partial English Translation).

Nakamoto, "Bitcoin: A Peer-to-Peer Electronic Cash System," www.bitcoin.org, 2005, 9 pages.

Extended European Search Report in European Patent Application No. 18846351.7, dated Mar. 16, 2020, 7 pages.

Hume, "Progressive Web Apps", Manning Early Access Program Progressive Web Apps Version 6, Jul. 25, 2017, 187 pages.

Wicki, "PWA: Create a "New Update Available" Notification using Service Workers", Jun. 2017, retrieved on Mar. 13, 2020, retrieved from URL <https://medium.com/progressive-web-apps/pwa-create-a-new-update-available-notification-using-service-workers-18be9168d717>, 5 pages.

Segmentfault.com [online], "Transform your website and become a PWA," Mar. 2017, retrieved on Jan. 22, 2020, retrieved from URL<https://segmentfault.com/a/1190000008880637>, 27 pages (with machine translation).

* cited by examiner

PAGE UPDATE METHOD AND APPARATUS

CROSS-REFERENCE TO RELATED APPLICATIONS

This application is a continuation of PCT Application No. PCT/CN2018/099872, filed on Aug. 10, 2018, which claims priority to Chinese Patent Application No. 201710703234.6, filed on Aug. 16, 2017, and each application is hereby incorporated by reference in its entirety.

TECHNICAL FIELD

The present disclosure relates to the field of computer technologies, and in particular, to a page update method and apparatus.

BACKGROUND

A progressive web application (PWA) is a concept proposed by Google, and draws constant attention from the mobile development community. The PWA aims to convert a web to an APP, and provide a user-friendly web application based on a capability of a modern browser. For example, if a browser supports the PWA, when a user accesses a page with a PWA feature for a plurality of times, the browser can automatically prompt the user to install an application on the desktop. As such, it is more convenient for the user to place a favorite web application on the desktop, so that the web application can be used as a native application, and page launching can be accelerated.

In addition, to implement offline access, the PWA can cache a page file by using a cache mechanism. For example, in the cache mechanism, a page file related to a page style can be cached by version, and data can be updated by using an asynchronous data request method such as ajax. When the page style needs to be updated, a developer can update and release page file code, and update a cache version to trigger style update.

SUMMARY

In view of this, one or more implementations of the present specification provide a page update method and apparatus, to improve page update efficiency in a cache of a PWA.

One or more implementations of the present specification are implemented by using the following technical solutions:

According to a first aspect, a page update method is provided, and the method includes: obtaining a new page file of a progressive web application (PWA) page; comparing a current page file of the PWA page with the new page file; and updating a file version in the new page file if there is a difference between the current page file and the new page file, and using an updated new page file as the current page file.

According to a second aspect, a page update apparatus is provided, and the apparatus includes: a data acquisition module, configured to obtain a new page file of a progressive web application (PWA) page; a data comparison module, configured to compare a current page file of the PWA page with the new page file; and a data update module, configured to update a file version in the new page file when the data comparison module determines that there is a difference between the current page file and the new page file, and use an updated new page file as the current page file.

According to a third aspect, a server device is provided, the device includes a memory, a processor, and a computer instruction that is stored in the memory and that can run on the processor, and the processor executes the instruction to implement the following steps: obtaining a new page file of a progressive web application (PWA) page; comparing a current page file of the PWA page with the new page file; and updating a file version in the new page file if there is a difference between the current page file and the new page file, and using an updated new page file as the current page file.

According to the page update method and apparatus in the one or more implementations of the present specification, a version update engine automatically updates the file version based on the comparison between the new page file and the old page file, so that page update can be triggered based on the updated file version. In this solution, even if an operator configures a block or a template, page code update can also be automatically triggered, thereby implementing a dynamic configuration of style in operations, alleviating the burden of a developer, and improving page update efficiency in the cache of a PWA.

BRIEF DESCRIPTION OF DRAWINGS

To describe the technical solutions in one or more implementations of the present specification or the existing technology more clearly, the following briefly describes the accompanying drawings needed for describing the implementations or the existing technology. Apparently, the accompanying drawings in the following description show merely some implementations described in the one or more implementations of the present specification, and a person of ordinary skill in the art can still derive other drawings from these accompanying drawings without creative efforts.

DESCRIPTION OF IMPLEMENTATIONS

To make a person skilled in the art understand the technical solutions in one or more implementations of the present specification better, the following clearly and comprehensively describes the technical solutions in the one or more implementations of the present specification with reference to the accompanying drawings in the one or more implementations of the present specification. Apparently, the described implementations are merely some but not all of the implementations. All other implementations obtained by a person of ordinary skill in the art based on the one or more implementations of the present specification without creative efforts shall fall within the protection scope of the present application.

Figure 1:
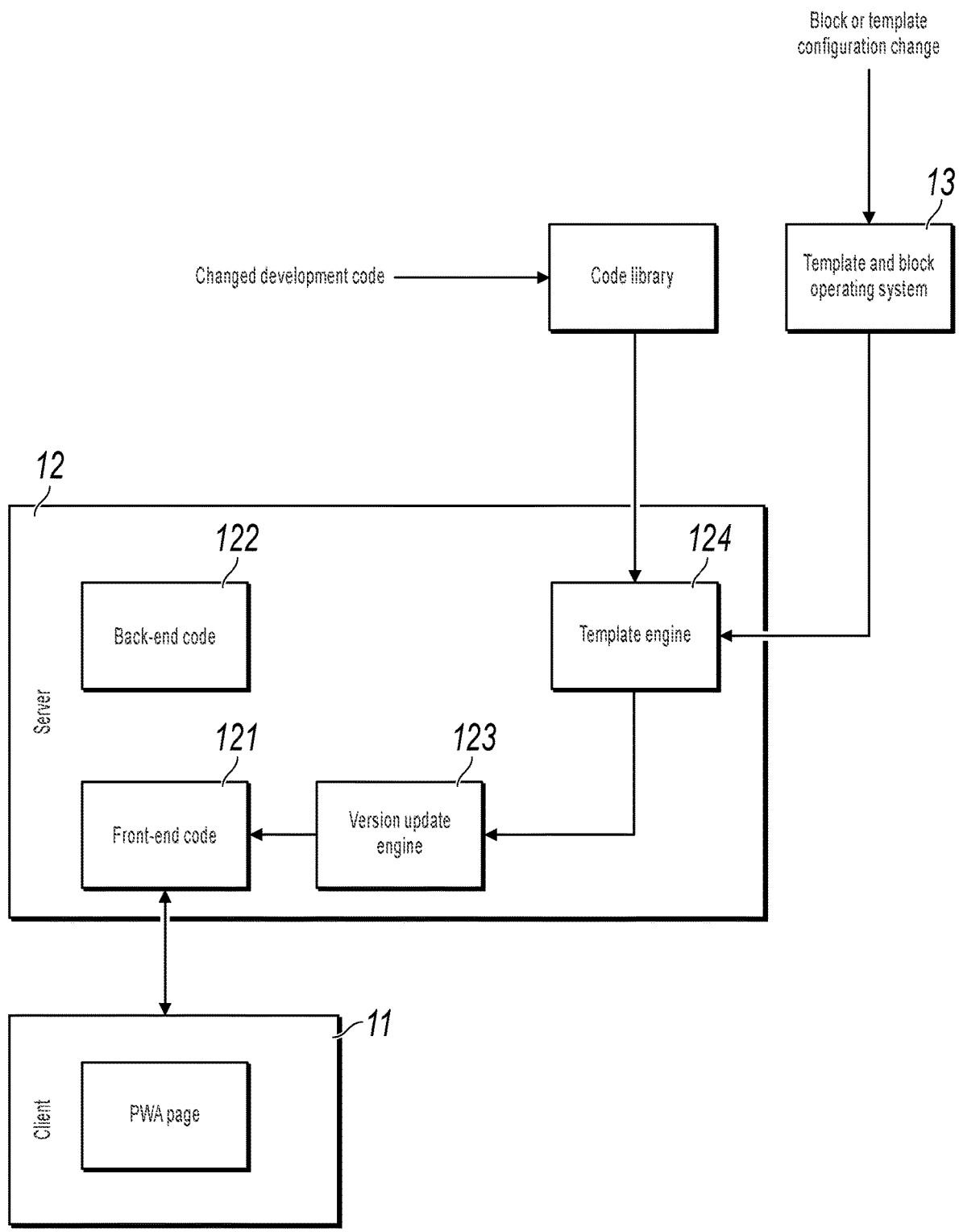
FIG. 1 is a diagram illustrating a system architecture that a PWA is applied to, according to one or more implementations of the present specification.

FIG. 1 shows an example of a system architecture that a PWA is applied to. As shown in FIG. 1, a client 11 can be a front end configured to display a PWA page, for example, display a PWA page in a browser. A server 12 can be a back end configured to provide PWA page display support. In a PWA page display process, the client 11 can interact with the server 12 to implement page display.

Referring back to FIG. 1, front-end code 121 can be responsible for a page display effect, and can include resources such as a js script, style code, and a picture. The style code can be code related to a page style. For example, a layout of each part of content of a page, a font and a color of page content, or a display shape of a region in a page can be determined based on the style code. In this example, the front-end code can be referred to as a page file. Back-end code 122 in FIG. 1 can be code related to acquisition and display of page data. For example, when a PWA page is requested to be displayed, a page display style can be obtained based on the front-end code 121, and page data is updated by using the back-end code 122 and an asynchronous data request method, to display the complete PWA page.

The front-end code 121 can include a cachelist and a cache version. The cachelist can include a file that needs to be cached to implement offline access, and can trigger an update by using the cache version. For example, when the page style is updated, content in the cachelist can be changed, and the cache version can be changed accordingly. As such, a new page style is obtained through triggering because of a change of the cache version.

Figure 2:
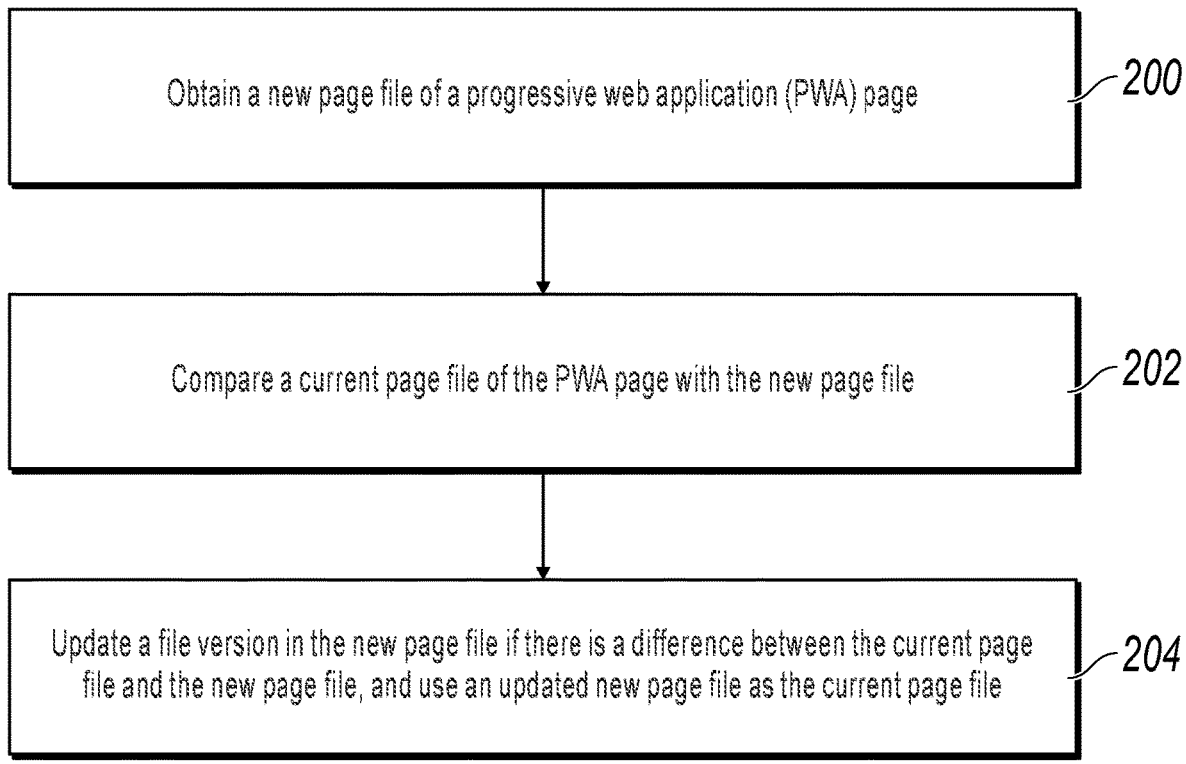
FIG. 2 illustrates a page update procedure, according to one or more implementations of the present specification.

FIG. 2 shows an example of a procedure of a page update method. The method can be used to automatically trigger file version update when code content of a page file changes. As shown in FIG. 2, the method can be performed by a version update engine in FIG. 1, and can include the following steps.

Step 200: Obtain a new page file of a progressive web application (PWA) page.

In the present step, the version update engine 123 can receive a new page file sent by a template engine 124. For example, the new page file can be a file that is generated by the template engine 124 based on an update of a page style, or can be a file that is generated based on an update of other content in the page.

Step 202: Compare a current page file of the PWA page with the new page file.

In the present step, the version update engine 123 can compare the new page file with the old page file, to determine whether there is a page file change. For example, when the page style or a js script of the page is changed, a difference between the two files can be detected by performing comparison in the present step. If there is a difference, step 204 is performed. Otherwise, if there is no difference, no file version update is triggered.

Step 204: Update a file version in the new page file if there is a difference between the current page file and the new page file, and use the updated new page file as the current page file.

In the present step, when there is a difference between the current page file and the new page file, the version update engine 123 automatically updates the file version. For example, the version update engine updates a cache version in the page file, and replaces the current page file with the new page file that includes the new cache version.

In the page update method in this example, the version update engine automatically updates the file version based on the comparison between the new page file and the old page file, so that page update can be triggered based on the updated file version. In this solution, the burden of a developer can be alleviated, and page update efficiency in the cache of a PWA is improved.

The following uses an update of a page style as an example to describe how to trigger a file version update procedure when the page style is updated. The page style can be updated when a developer releases changed code or an operator configures a style in a template and block operating system.

As shown in FIG. 1, the template and block operating system 13 can be a human-computer interaction system for the operator to modify a page style, and allows the operator to modify a block or a template in a page through human-computer interaction. The block can be a rectangular region in the page, and is marked by using an html syntax <div></div>. The template can be a module written in a template language such as velocity. To automatically trigger front-end code update and page style change when the operator changes a block configuration and a template configuration by using the template and block operating system, a version update engine 123 can be added in this example, as shown in FIG. 1.

Figure 3:
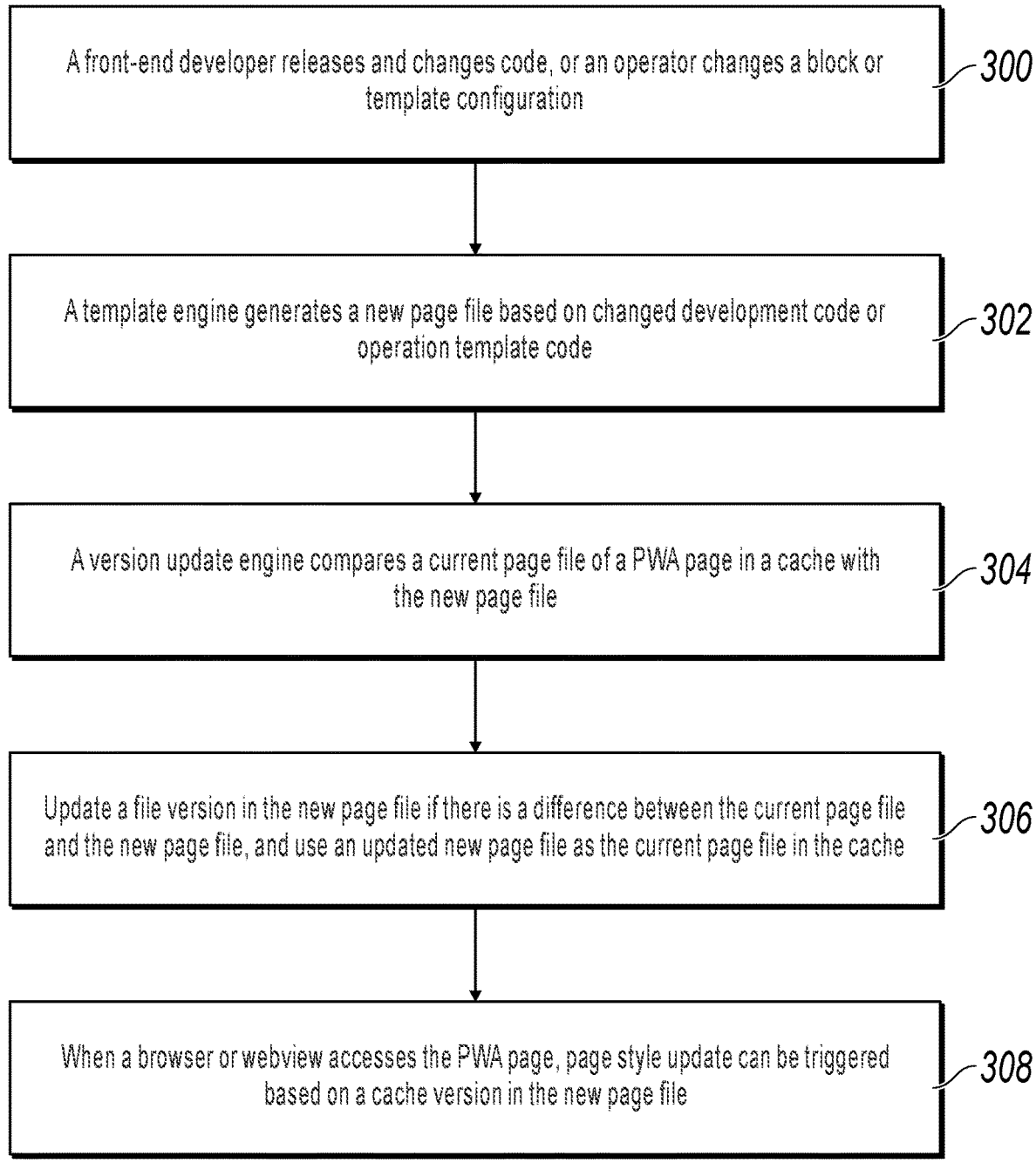
FIG. 3 illustrates a page style update procedure, according to one or more implementations of the present specification.

The version update engine 123 can automatically update a cache version in front-end code when the operator changes a block configuration and a template configuration, to dynamically update a page style, and can trigger style update when development code corresponding to the page style changes. FIG. 3 shows an example of a procedure for implementing page style update based on the system in FIG. 1. The procedure can include the following steps.

Step 300: A front-end developer releases and changes code, or an operator changes a block or template configuration.

For example, as shown in the example in FIG. 1, the developer can perform code change corresponding to page style update. For example, to change a layout of a page or change a display style of a part of a page, corresponding code can be changed. This can be referred to as development code change.

In another example, the operator can configure and change a block or a template in a page by using a template and block operating system, to change a page style, for example, change a shape or a location of an advertisement bar in the page. Corresponding generated code can be referred to as operation template code. For example, the operation template code can be generated by the template and block operating system and then transmitted to a template engine. Alternatively, the code can be generated by the template engine based on a block or template configuration change in the template and block operating system. The following provides description by using an example in which the template and block operating system generates the operation template code.

Step 302: The template engine generates a new page file based on changed development code or operation template code. In the present step, the template engine 124 can generate the new page file of the PWA page based on the changed development code or the operation template code obtained in step 300. The new page file is a file that is generated based on an update of a page style, and the new page file can be sent to a version update engine.

Step 304: The version update engine compares a current page file of the PWA page in a cache with the new page file.

For example, the version update engine 123 can separately obtain the current page file of the PWA page and the new page file obtained in step 302. In addition, the version update engine 123 can determine whether different content exists in a cachelist in the current page file and a cachelist in the new page file. For example, the version update engine determines whether different content exists in a same corresponding file in the cachelist or whether different files exist. For another example, the version update engine determines whether a new js or html file exists in the cachelist in the new page file or whether a file in the current page file is absent from the new page file.

Step 306: Update a file version in the new page file if there is a difference between the current page file and the new page file, and use an updated new page file as the current page file in the cache.

For example, if it is determined that there is a difference between the current page file and the new page file, for example, there is a change in content of a corresponding file in the cachelist, or there is a new file in the cachelist, the version update engine can replace the cachelist in the current page file with the cachelist in the new page file, and update a cache version in the new page file. This corresponds to the step of generating new front-end code in FIG. 1.

Step 308: When a browser or webview accesses the PWA page, page style update can be triggered based on the cache version in the new page file.

In the page style update method in this example, the version update engine automatically updates the file version, for example, automatically updates the cachelist and the cache version, so that page style update can be triggered based on the updated file version. In this solution, even if an operator configures a block or a template, page code update can be automatically triggered, thereby implementing a dynamic configuration of style in operations, alleviating the burden of a developer, and improving page style update efficiency in the cache of a PWA.

Figure 4:
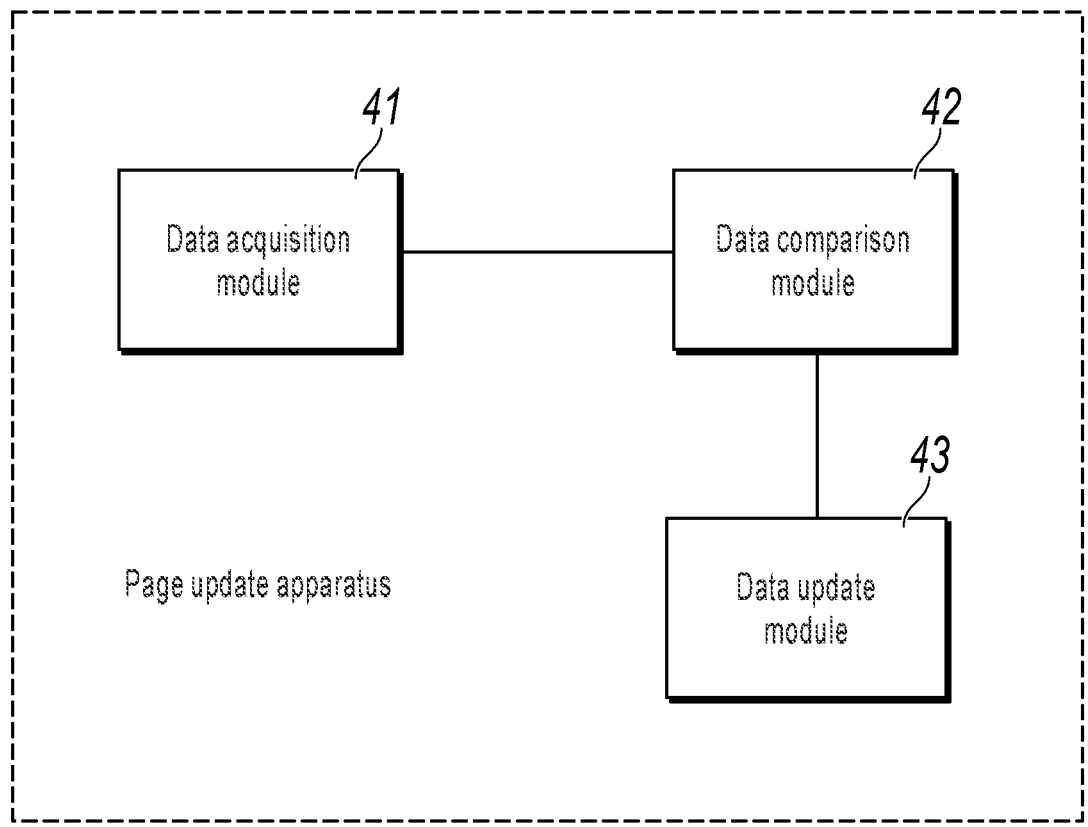
FIG. 4 is a schematic structural diagram of a page update apparatus, according to one or more implementations of the present specification.

To implement the page update method in one or more implementations of the present specification, FIG. 4 provides a page update apparatus. The page update apparatus can include a data acquisition module 41, a data comparison module 42, and a data update module 43.

The data acquisition module 41 is configured to obtain a new page file of a progressive web application (PWA) page.

The data comparison module 42 is configured to compare a current page file of the PWA page with the new page file.

The data update module 43 is configured to update a file version in the new page file when the data comparison module determines that there is a difference between the current page file and the new page file, and use an updated new page file as the current page file.

In an example, the data acquisition module 41 is configured to receive a new page file sent by a template engine, where the new page file is a file that is generated by the template engine based on an update of a page style.

In an example, the update of the page style includes a change of development code corresponding to the page style or a template or block configuration change.

In an example, the data comparison module 42 is configured to separately obtain a cachelist in the current page file and a cachelist in the new page file; and compare the cachelist in the current page file with the cachelist in the new page file to determine whether different content exists in a same corresponding file or whether different files exist.

In an example, the data update module 43 is configured to replace the cachelist in the current page file with the cachelist in the new page file, and update a cache version.

An execution sequence of the steps in the procedure shown in FIG. 2 or FIG. 3 is not limited to a sequence in the flowchart. In addition, descriptions of the steps can be implemented as a form of software, hardware, or a combination thereof. For example, a person skilled in the art can implement the descriptions in a form of software code, and the code can be a computer executable instruction that can implement logical functions corresponding to the steps. When implemented in the form of software, the executable instruction can be stored in a memory and executed by a processor in a device.

For example, corresponding to the previous method, one or more implementations of the present specification provide a server device. The device can include a processor, a memory, and a computer instruction that is stored in the memory and that can run on the processor. The processor executes the instruction to implement the following steps: obtaining a new page file of a progressive web application (PWA) page; comparing a current page file of the PWA page with the new page file; and updating a file version in the new page file if there is a difference between the current page file and the new page file, and using an updated new page file as the current page file.

The apparatus or module described in the previous implementations can be implemented by a computer chip or an entity, or can be implemented by a product with a function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or a combination of any of these devices.

For ease of description, the previous apparatus is described by dividing functions into various modules. Certainly, in the one or more implementations of the present specification, functions of each module can be implemented in one or more pieces of software and/or hardware.

A person skilled in the art should understand that one or more implementations of the present specification can be provided as a method, a system, or a computer program product. Therefore, the one or more implementations of the present specification can use a form of hardware only implementations, software only implementations, or implementations with a combination of software and hardware. In addition, the one or more implementations of the present specification can use a form of a computer program product that is implemented on one or more computer usable storage media (including but not limited to a disk memory, a CD-ROM, and an optical memory) that include computer usable program code.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is worthwhile to further note that the terms "include", "comprise", or their any other variants are intended to cover a nonexclusive inclusion, so a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

The one or more implementations of the present specification can be described in common contexts of computer executable instructions executed by a computer, such as a program module. The program module usually includes a routine, a program, an object, a component, a data structure, etc. executing a specific task or implementing a specific abstract data type. The one or more implementations of the present specification can alternatively be practiced in distributed computing environments. In the distributed computing environments, tasks are executed by remote processing devices that are connected through a communications network. In the distributed computing environment, the program module can be located in both local and remote computer storage media including storage devices.

The implementations of the present specification are described in a progressive way. For same or similar parts of the implementations, references can be made to the implementations. Each implementation focuses on a difference from the other implementations. Particularly, the server device implementation is basically similar to the method implementation, and therefore is described briefly. For related parts, references can be made to the related descriptions in the method implementation.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily require a particular execution sequence to achieve the desired results. In some implementations, multitasking and parallel processing can be advantageous.

The previous descriptions are merely one or more preferred implementations of the present specification, but are not intended to limit the present disclosure. Any modification, equivalent replacement, or improvement made without departing from the spirit and principle of the present disclosure shall fall within the protection scope of the present disclosure.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

Techniques described herein produce one or more technical effects. For example, efficiency of page style updates is improved. The version update engine can compare a current page file of a PWA page with a new page file of the PWA page, determine whether there is a difference between the current page file and the new page file, and update a file version in the new page file if there is a difference between the current page file and the new page file. The updated file version can then trigger a page style update. Thus, the update and development speed for a new page style is faster than in traditional methods. In another example, the described techniques can save computer processing cycles, computer memory usage, and network bandwidth when compared to updating page styles with traditional methods. For example, traditional methods require a developer to update and release page file code, and to update a cache version in order to trigger a page style update. With the described techniques, even if an operator configures a block or a template, page style updates can be automatically triggered, thereby implementing dynamic page style configurations. The described techniques can also prevent unnecessary data processing by developers and reduce amounts of data transferred between developers and operators. One or more developer burdens can also be alleviated, because automatic page style updates can reduce developer involvement in a page style update process.

What is claimed is:

1. A computer-implemented method for page update, comprising:
   obtaining, at a server, a new page file of a progressive web application (PWA) page;
   comparing, at the server, a current page file of the PWA page with the new page file, wherein the new page file and the current page file are stored at the server, and wherein the new page file and the current page file support display of the PWA page;
   determining, at the server, that there is a difference between the current page file and the new page file; and
   updating, at the server, a cache version in the new page file, wherein the new page file is used as the current page file, and wherein when a client accesses the PWA page, the cache version is used by the client to trigger a page style update of the PWA page in response to detecting that the cache version has been updated.

2. The computer-implemented method according to claim 1, wherein obtaining a new page file of a PWA page comprises:
   receiving a new page file sent by a template engine, wherein the new page file is a file that is generated by the template engine based on an update of a page style.

3. The computer-implemented method according to claim 2, wherein the update of the page style comprises at least one of: a change of development code corresponding to the page style, a template change, or a block configuration change.

4. The computer-implemented method according to claim 1, wherein comparing a current page file of the PWA page with the new page file comprises:
   obtaining a first cachelist in the current page file;
   obtaining a second cachelist in the new page file; and
   comparing the first cachelist with the second cachelist to determine whether there is a content update to a corresponding file in each of the first cachelist and the second cachelist.

5. The computer-implemented method according to claim 4, wherein updating the cache version in the new page file comprises:
   replacing the first cachelist in the current page file with the second cachelist in the new page file.

6. The computer-implemented method according to claim 1, wherein comparing a current page file of the PWA page with the new page file comprises:
   obtaining a first cachelist in the current page file;

obtaining a second cachelist in the new page file; and comparing the first cachelist with the second cachelist to determine whether a file is added or deleted in the second cachelist as compared to the first cachelist.

7. The computer-implemented method according to claim 6, wherein updating the cache version in the new page file comprises:

replacing the first cachelist in the current page file with the second cachelist in the new page file.

8. The computer-implemented method according to claim 1, comprising, after updating the cache version in the new page file:

requesting, by the client and from the server, the current page file;

determining, by the client, that the cache version has been updated; and triggering, by the client, the page style update of the PWA page, wherein the triggering comprises caching the current page file in the client.

9. A non-transitory, computer-readable medium storing one or more instructions executable by a computer system to perform operations comprising:

obtaining, at a server, a new page file of a progressive web application (PWA) page;

comparing, at the server, a current page file of the PWA page with the new page file, wherein the new page file and the current page file are stored at the server, and wherein the new page file and the current page file support display of the PWA page;

determining, at the server, that there is a difference between the current page file and the new page file; and updating, at the server, a cache version in the new page file, wherein the new page file is used as the current page file, and wherein when a client accesses the PWA page, the cache version is used by the client to trigger a page style update of the PWA page in response to detecting that the cache version has been updated.

10. The non-transitory, computer-readable medium according to claim 9, wherein obtaining a new page file of a PWA page comprises:

receiving a new page file sent by a template engine, wherein the new page file is a file that is generated by the template engine based on an update of a page style.

11. The non-transitory, computer-readable medium according to claim 10, wherein the update of the page style comprises at least one of: a change of development code corresponding to the page style, a template change, or a block configuration change.

12. The non-transitory, computer-readable medium according to claim 9, wherein comparing a current page file of the PWA page with the new page file comprises:

obtaining a first cachelist in the current page file;
obtaining a second cachelist in the new page file; and
comparing the first cachelist with the second cachelist to determine whether there is a content update to a corresponding file in each of the first cachelist and the second cachelist.

13. The non-transitory, computer-readable medium according to claim 12, wherein updating the cache version in the new page file comprises:

replacing the first cachelist in the current page file with the second cachelist in the new page file.

14. The non-transitory, computer-readable medium according to claim 9, wherein comparing a current page file of the PWA page with the new page file comprises:

obtaining a first cachelist in the current page file;
obtaining a second cachelist in the new page file; and
comparing the first cachelist with the second cachelist to determine whether a file is added or deleted in the second cachelist as compared to the first cachelist.

15. The non-transitory, computer-readable medium according to claim 14, wherein updating the cache version in the new page file comprises:

replacing the first cachelist in the current page file with the second cachelist in the new page file.

16. The non-transitory, computer-readable medium according to claim 9, comprising, after updating the cache version in the new page file:

requesting, by the client and from the server, the current page file;

determining, by the client, that the cache version has been updated; and triggering, by the client, the page style update of the PWA page, wherein the triggering comprises caching the current page file in the client.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

obtaining, at a server, a new page file of a progressive web application (PWA) page;

comparing, at the server, a current page file of the PWA page with the new page file, wherein the new page file and the current page file are stored at the server, and wherein the new page file and the current page file support display of the PWA page;

determining, at the server, that there is a difference between the current page file and the new page file; and updating, at the server, a cache version in the new page file, wherein the new page file is used as the current page file, and wherein when a client accesses the PWA page, the cache version is used by the client to trigger a page style update of the PWA page in response to detecting that the cache version has been updated.

18. The computer-implemented system according to claim 17, wherein obtaining a new page file of a PWA page comprises:

receiving a new page file sent by a template engine, wherein the new page file is a file that is generated by the template engine based on an update of a page style.

19. The computer-implemented system according to claim 18, wherein the update of the page style comprises at least one of: a change of development code corresponding to the page style, a template change, or a block configuration change.

20. The computer-implemented system according to claim 17, wherein comparing a current page file of the PWA page with the new page file comprises:

obtaining a first cachelist in the current page file;
obtaining a second cachelist in the new page file; and
comparing the first cachelist with the second cachelist to determine whether there is a content update to a corresponding file in each of the first cachelist and the second cachelist.

21. The computer-implemented system according to claim 20, wherein updating the cache version in the new page file comprises:

replacing the first cachelist in the current page file with the second cachelist in the new page file.

22. The computer-implemented system according to claim 17, wherein comparing a current page file of the PWA page with the new page file comprises:
   obtaining a first cachelist in the current page file;
   obtaining a second cachelist in the new page file; and
   comparing the first cachelist with the second cachelist to determine whether a file is added or deleted in the second cachelist as compared to the first cachelist.

23. The computer-implemented system according to claim 22, wherein updating the cache version in the new page file comprises:
   replacing the first cachelist in the current page file with the second cachelist in the new page file.

24. The computer-implemented system according to claim 17, comprising, after updating the cache version in the new page file:
   requesting, by the client and from the server, the current page file;
   determining, by the client, that the cache version has been updated; and
   triggering, by the client, the page style update of the PWA page, wherein the triggering comprises caching the current page file in the client.

* * * * *